United States Patent [19]
McGoldrick et al.

[11] Patent Number: 4,714,431
[45] Date of Patent: Dec. 22, 1987

[54] ELECTRICAL DISTRIBUTION SYSTEM HAVING AN IMPROVED PLUG-IN ASSEMBLY FOR CURRENT TAP-OFF

[75] Inventors: Gilbert A. McGoldrick, Hamilton, Ohio; Allan E. Slicer, Brookville, Ind.

[73] Assignee: Square D Company, Palatine, Ill.

[21] Appl. No.: 650,378

[22] Filed: Sep. 13, 1984

[51] Int. Cl.[4] .................... H02G 5/08
[52] U.S. Cl. .................... 439/212; 174/68 B; 174/99 B
[58] Field of Search .................... 339/22 B, 22 R, 21 R, 339/20, 23, 24; 174/68 B, 88 B, 99 B

[56] References Cited

U.S. PATENT DOCUMENTS

| | | | |
|---|---|---|---|
| 3,004,096 | 10/1961 | Rowe | 339/22 B |
| 3,384,855 | 5/1968 | Jorgensen et al. | 339/22 B |
| 3,566,331 | 2/1971 | Stanback et al. | 339/22 R |
| 3,710,302 | 1/1973 | Shannon et al. | 339/22 B |
| 3,922,053 | 11/1975 | Hafer | 339/22 B |

*Primary Examiner*—Gil Weidenfeld
*Assistant Examiner*—Thomas M. Kline
*Attorney, Agent, or Firm*—Richard T. Guttman; Larry I. Golden

[57] ABSTRACT

An improved plug-in assembly facilitating the tap-off of electrical current from bus bars carried in a busway section that includes opposite side rails and a plurality of plug-in openings formed in each of the side rails in back-to-back association or registration with each other. The plug-in assembly includes a substantially symmetrical insulating base and a door, each swingably connected to the side rail. Ears formed in the side rail adjacent the plug-in opening are aligned with ears formed on the door and a drive screw extends through holes in each pair of ears and into an opening in a support post provided on the side of each base. The screw is fittingly retained in the ear of the side rail while the door and base members fit loosely over the drive screw to permit those parts to swing between an open and a closed position. A metal cover latch is self-retained in one of a pair of symmetrically positioned latch retaining grooves on the front of the base which retains an integral catch portion on the door. A hole in each retaining groove facilitates connection of the base to the rail member with a pair of screws. The screws can be removed from the rail to permit swing-open movement of the assembly for certain types of tap-off, with the self-retained latch permitting the screws to be captured between the door and the base. While the front portion of the base is symmetrical, the rear portion includes five ribs shaped and dimensioned for overlaping complementary receipt of the ribs of an identical base which has been rotated 180° and is carried in a registered opening of the busway section.

7 Claims, 13 Drawing Figures

ELECTRICAL DISTRIBUTION SYSTEM HAVING AN IMPROVED PLUG-IN ASSEMBLY FOR CURRENT TAP-OFF

BACKGROUND OF THE INVENTION

Field of the Invention

This invention relates to an electrical distribution system, and more particularly to an improved plug-in assembly for current tap-off from plug-in busway.

Description of the Prior Art

The present invention represents an improvement over the plug-in base assemblies disclosed in U.S. Pat. No. 3,566,331, issued Feb. 23, 1971 and U.S. Pat. No. 3,384,855, issued May 21, 1968, to which reference may be had for description of common features and applications. Each of the afore-referenced patents is assigned to the same assignee as the instant invention and is hereby incorporated by reference.

SUMMARY OF THE INVENTION

An improved plug-in opening base is provided which is constructed to permit reversible use on either side of the busway section. The plug-in base is designed for back to back association in busway sections having relatively narrow-width bus bars by overlapping the ribs on the back of opposing base members to provide sufficient electrical clearance. The plug-in base and associated swingable door are uniquely mounted to the side rail to facilitate ready assembly of the distribution system as well as to provide for desirable operation of the system at these plug-in locations.

The base and cover are pivotally secured to the rail. Additionally, the screws which are used to fixedly mount the base to the rail are stored between the base and the door when the base is swung out for tap off.

It is an object of the present invention to provide an improved electrical distribution system of economic construction.

It is a further object of this invention to provide a plug-in base which overlaps and complementarily receives an identical base in back to back association. It is still a further object of this invention to provide a readily mounted plug-in base and door assembly which facilitates easy operation.

Further objects and features of the invention will be readily apparent to those skilled in the art from the following specification including the appended claims and the accompanying drawings of the invention in which:

Figure 8:
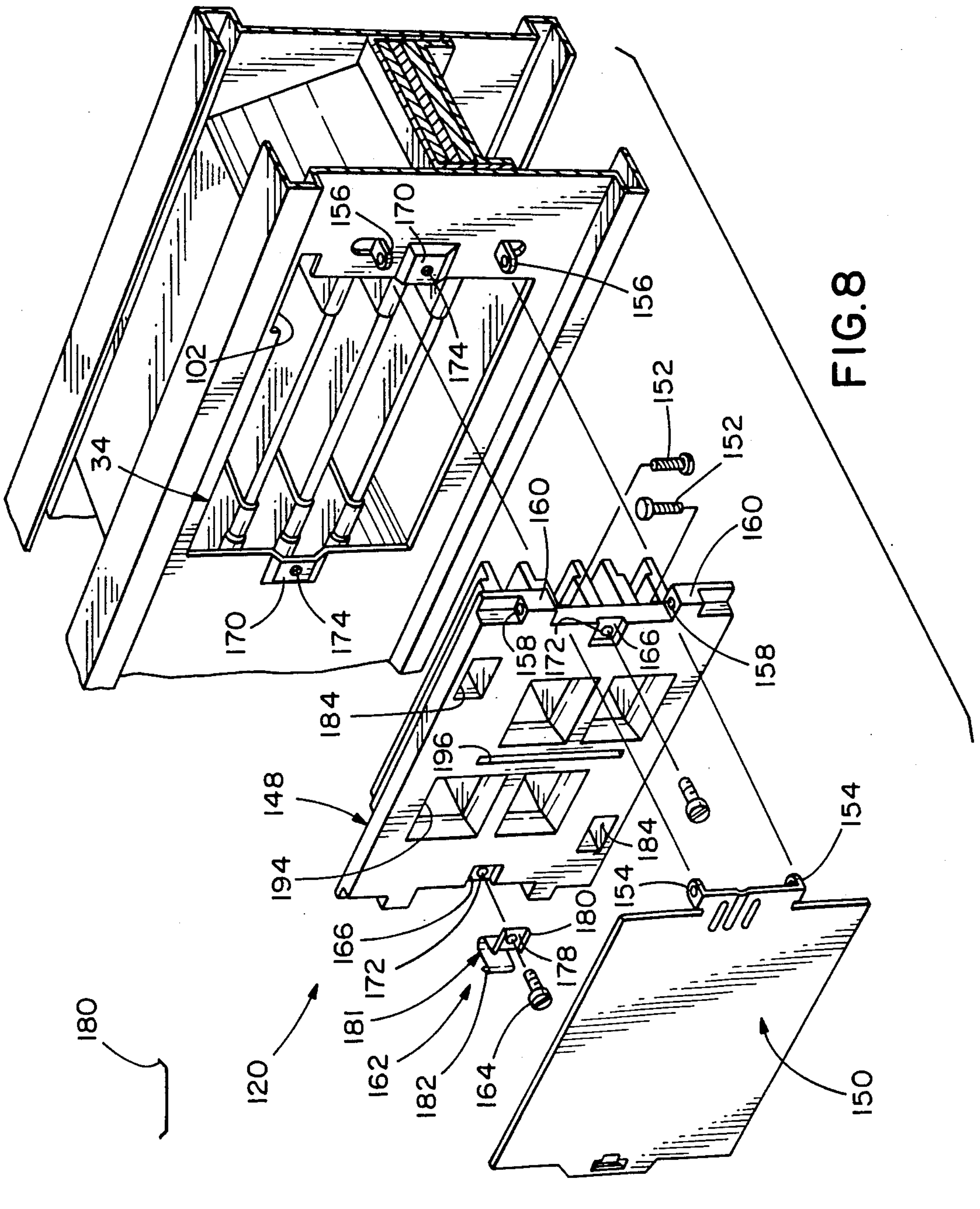
FIG. 8 is an exploded perspective view showing a plug-in base assembly and a portion of side rail of the present invention.

FIG. **8*a* is an end view of the base shown in FIG. 8**.

Figure 8A:
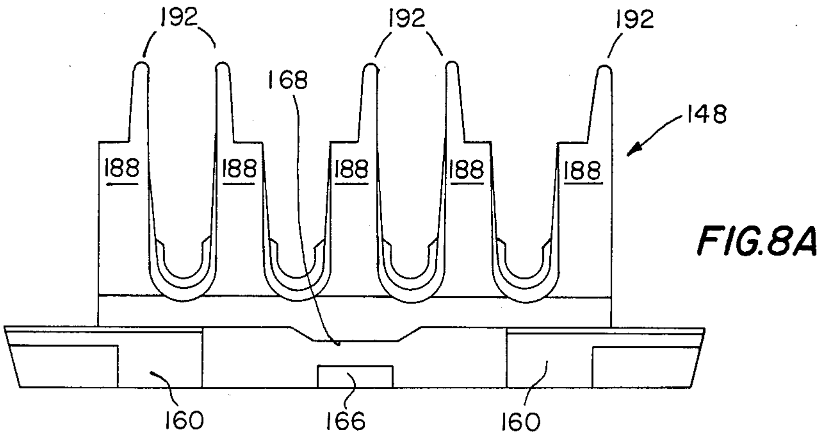
Figure 8B:
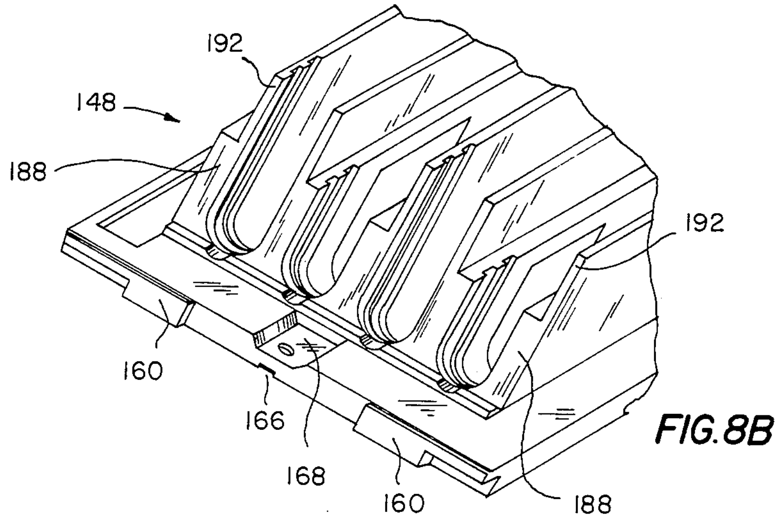

FIG. **8*b* is a partial perspective view of the back side of the base shown in FIGS. 8 and 8*a***.

Figure 9:
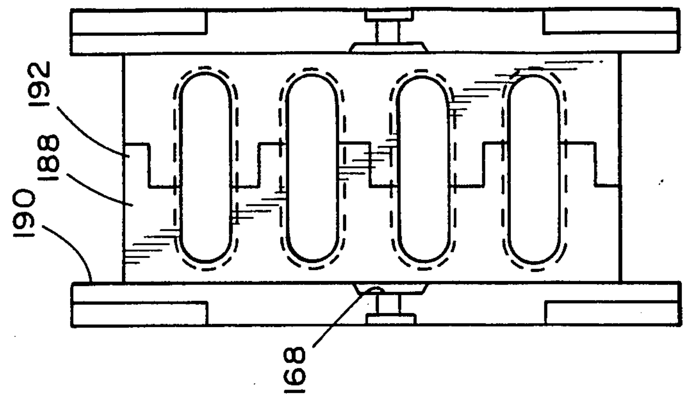

FIG. 9 is an end view of the base shown in FIG. 8 in back to back association with another base.

Figure 10:
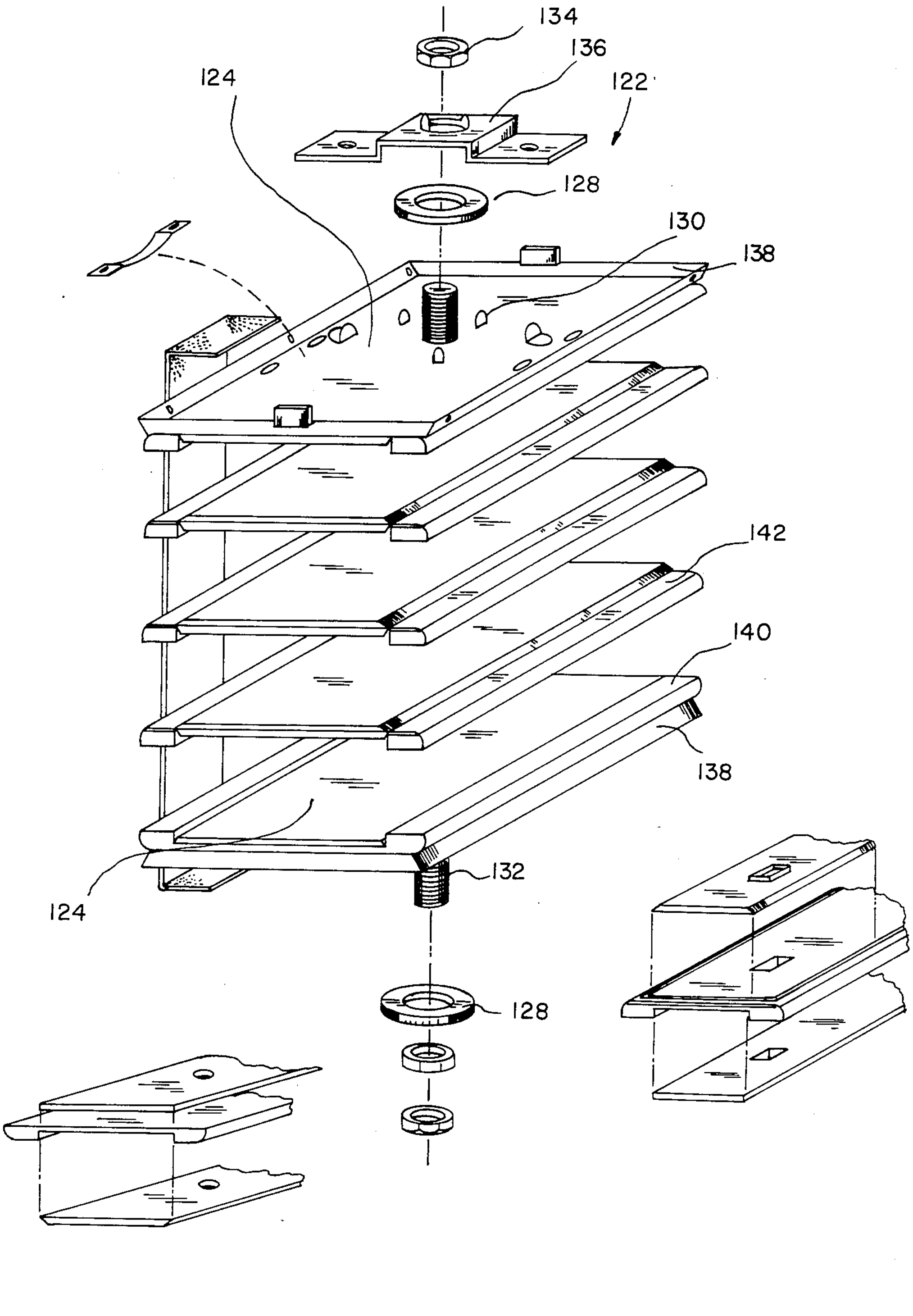

FIG. 10 is an exploded perspective view of a joint in accordance with the present invention.

Figure 11:
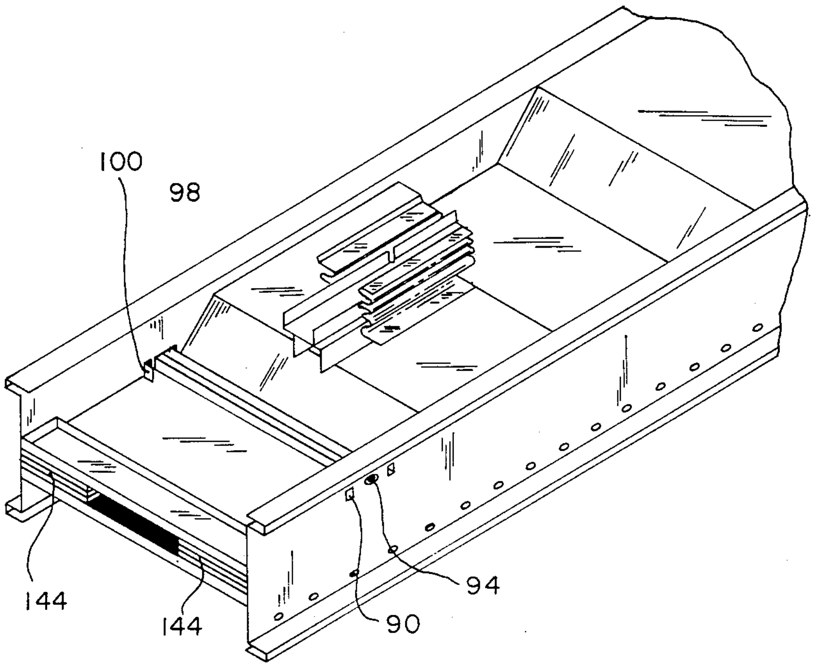

FIG. 11 is a partial perspective view showing a double sandwich section of plug-in busway in accordance with the present invention.

DESCRIPTION OF THE PREFERRED EMBODIMENT

Figure 1:
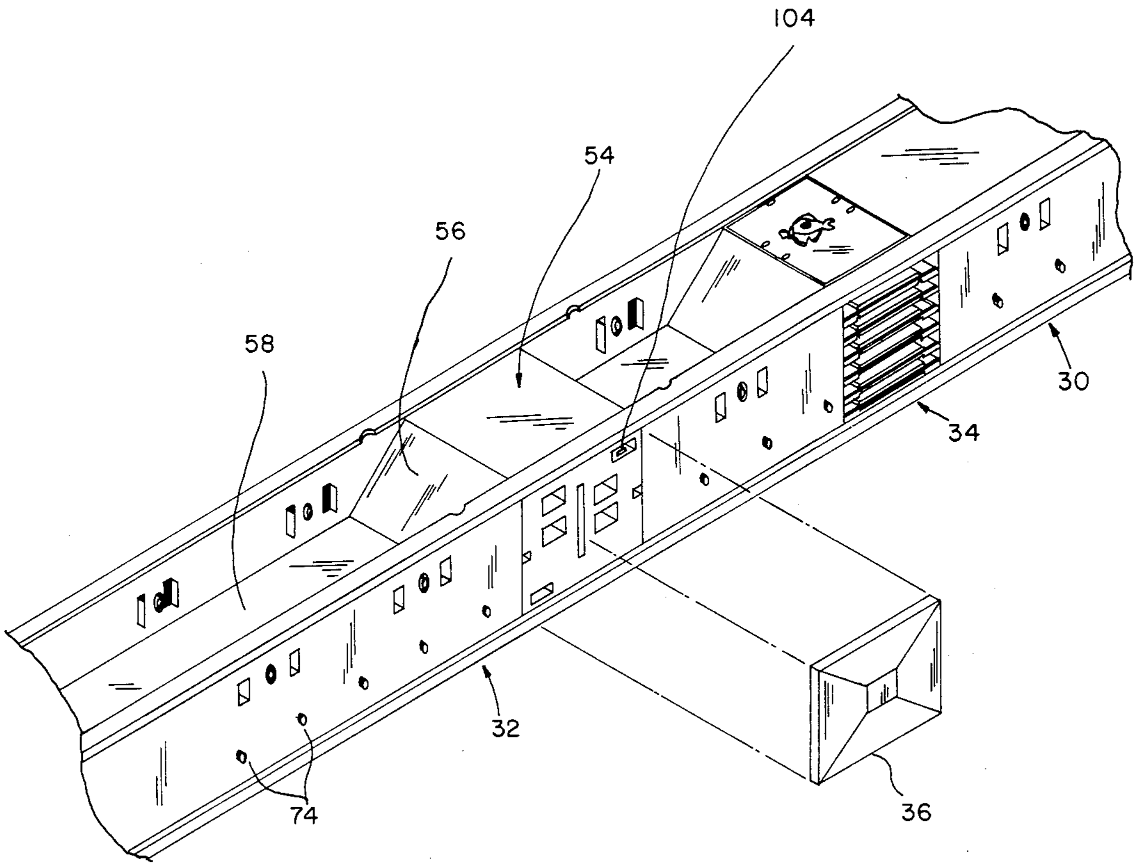
FIG. 1 is a perspective view showing connected feeder and plug-in sections of busway in accordance with the present invention.

The electrical distribution system of the present invention relates to plug-in sections of bus bars identified generally by reference character 32 in FIG. 1. The present design is intended for busway sytems carrying from 800A through 5000A, although it is not necessarily restricted to such applications. The current carrying capacity of the busway is dependent upon the size and material of the individual bus bars as well as the number of runs of bus bars within a busway section. The U.S. Pat. No. 3,384,855 discloses both single and double runs of bus bars. The plug-in sections are provided with plug-in openings 34 at various locations along its length as discussed, for example, in the previously referred to U.S. Pat. No. 3,566,331. The plug-in openings 34 facilitate the tap-off of current from those locations and are covered by a swingable door 36 when the opening is not being used. The bus bars are carried between a pair of side rails 38 which will later be further described.

The main phase bus bars 40 of the instant invention are appropriately insulated as shown, for example in U.S. application Ser. No. 650,376 by Allan Slicer filed concurrently herewith which is abandoned, the disclosure of which is hereby incorporated by reference. The bars are carried in stacked relationship except where physical separation of the bars is required to facilitate a splice connection between sections of busway or at the tap off locations of the plug-in busway. At those locations where connections may be made, the bus bars are offset to provide sufficient clearance between bars for connections. The main phase bus bars 40 are enveloped by a ground bus 42 which includes an upper section 44 and a lower section 46. The upper section 44 includes a top portion **44*a* with opposite side flanges 44*b* extending toward the lower section 46. The lower section 46 includes a bottom portion 46*a* with similarly extending side flanges 46*b*, although the lower side flanges 46*b* are substantially shorter than the upper side flanges 44*b*. The lower section 46 is positioned between the flanges 44*b* of the upper section, such that the two pairs of flanges are substantially aligned at the bottom edge thereof, with the main phase bus bars 40 sandwiched between the top portion 44*a* of the upper section and the bottom portion 46*a* of the lower section, while also being located between the side flanges 44*b*** of the upper section.

Figure 2:
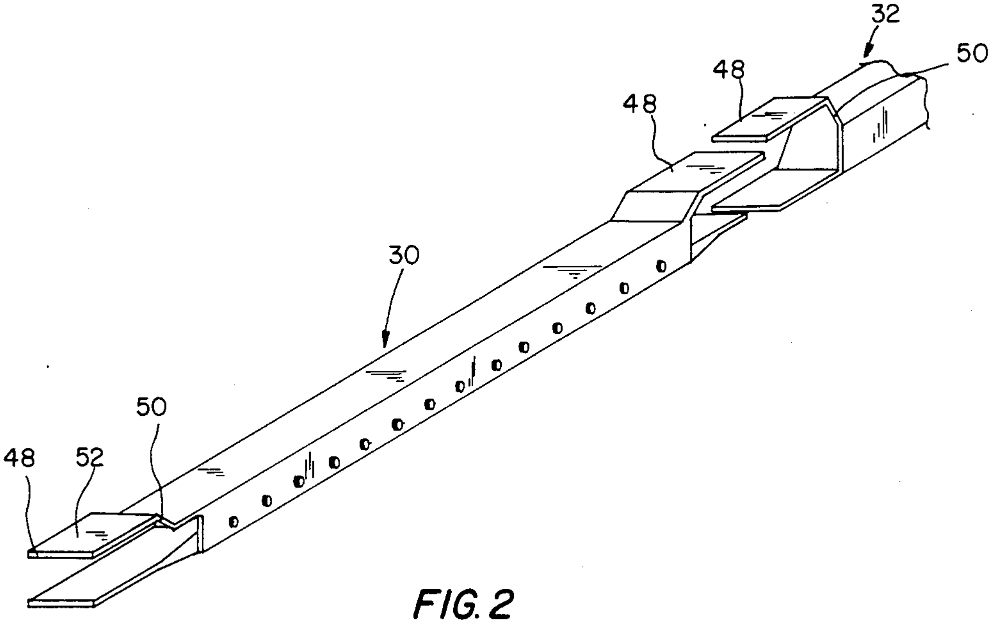
FIG. 2 is a perspective view showing the ground bus in accordance with the instant invention.
Figure 3:
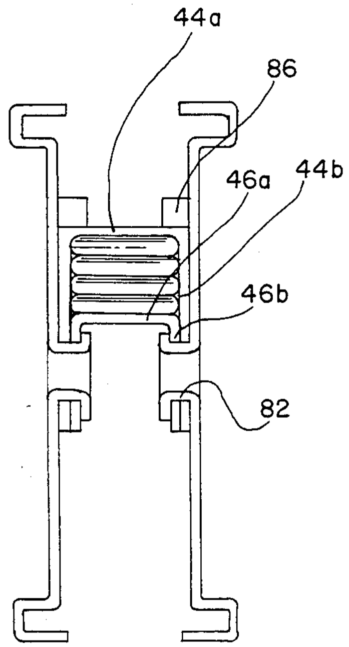
FIG. 3 is a cross-sectional view showing the housing enclosing the main phase bus bars in accordance with the present invention.
Figure 4:
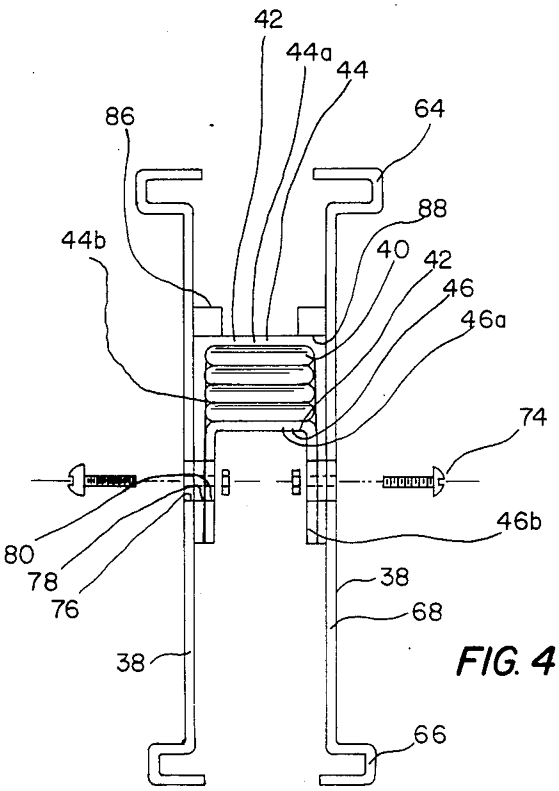
FIG. 4 is a cross-sectional view as shown in FIG. 3 incorporating an alternate method of fastening.
Figure 5:
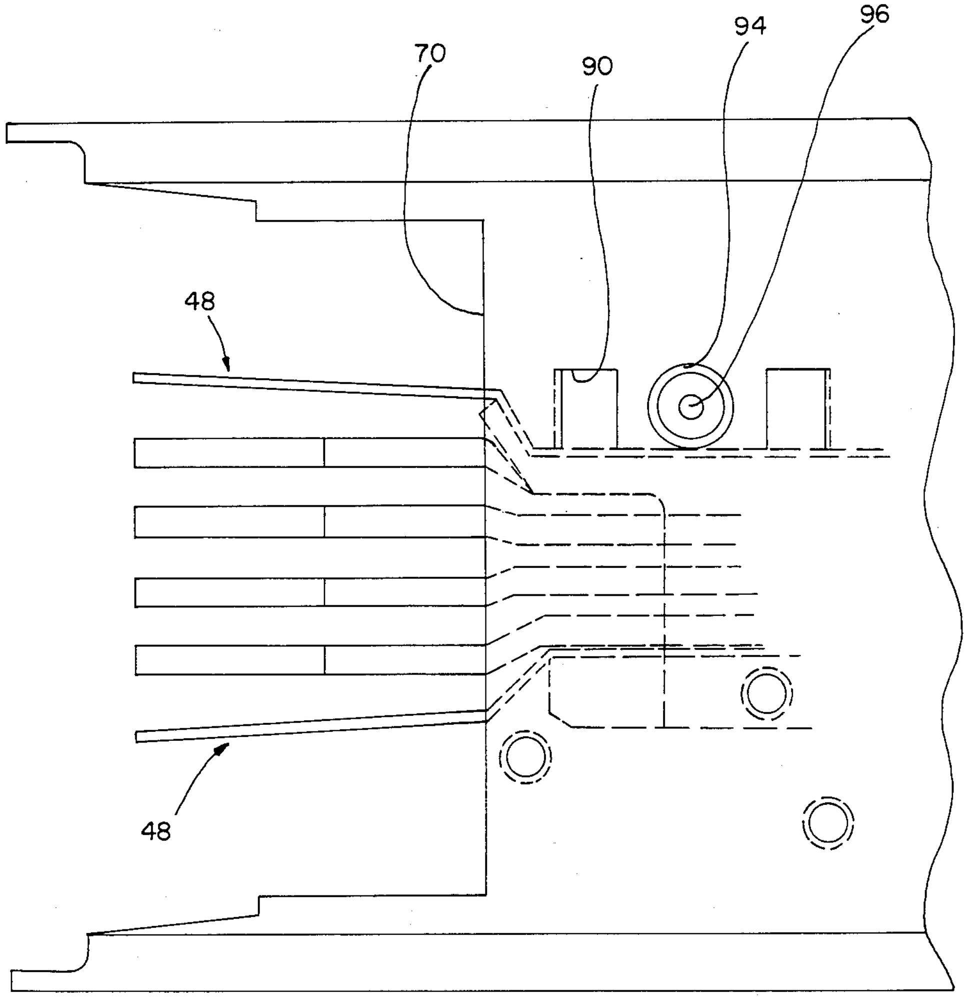
FIG. 5 is a partial side view showing an end of a section of busway in accordance with the present invention.
Figure 6:
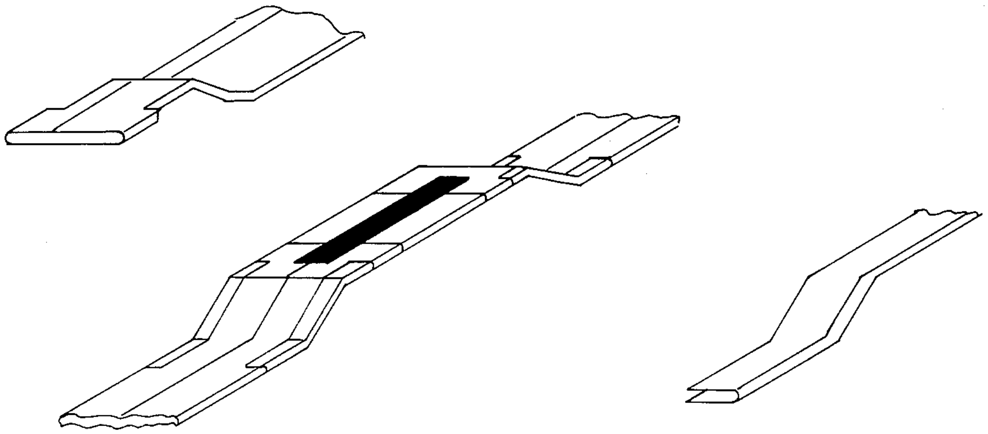
FIG. 6 is a perspective view showing an insulated bus bar and segments of insulation in accordance with the present invention.
Figure 7:
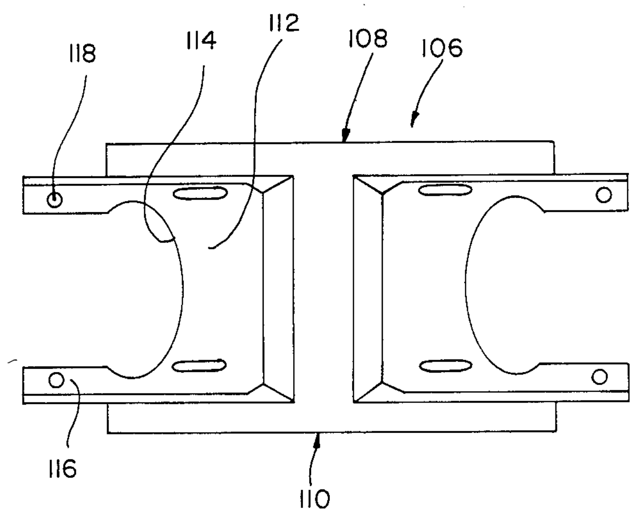
FIG. 7 is a side view of a tie channel used to tie adjoining sections of the busway as shown in FIG. 1 together.

On both the plug-in sections 32 and feeder sections 30, the ground bus 42 includes a flared end portion 48 to accommodate the separation between bus bars required for splice connection between sections. The flared end portion 48 as shown in FIGS. 2 and 5 includes an inclined section 50 and an extending connecting portion 52 on both the upper and lower sections of the ground bus, 44 and 46, respectively. The flared formation facilitates drainage of water which may fall on the joint area. The plug-in sections 32 of busway include humped portions 54 on both the upper and lower sections of ground bus corresponding to the plug-in opening locations 34 along the length of the busway. Each humped portion 54 includes opposite inclined top portions 56 and a bridging top portion 58 integrally connecting the two inclined top portions 56 as well as opposite inclined bottom portions and a bridging bottom portion integrally connecting the two inclined bottom portions. Plug-in openings are also provided in the ground bus at the plug-in locations.

The ground bus 42, together with the pair of opposite side rails 38 form a housing for the main phase bus bars 40. The opposing side rails 38 each include a top channel 64, a bottom channel 66 and an inwardly recessed main side portion 78 intermediate the top and bottom channels. The rails are positioned such that the top channels 64 and bottom channels 66 are inwardly directed. At the end of each busway section, a cutout 70 is provided in the main side portion of each rail where the bus bars are offset to facilitate connection between portions and removal of a connecting joint which is more fully described in U.S. application Ser. No. 650,379 by Allan Slicer and Robert Whitney filed concurrently herewith which is abandoned, the disclosure of which is hereby incorporated by reference.

At various locations along the length of the housing the side rails 38 are fastened to the upper and lower ground bus sections, 44 and 46, respectively along the overlapping side flanges **44*b* and 46*b* of the ground bus as more fully explained in U.S. application Ser. No. 650,377, U.S. Pat. No. 4,673,229 by G. N. Jorgensen, G. A. McGoldrick and A. E. Slicer filed concurrently herewith, the disclosure of which is hereby incorporated by reference. As referred to previously, the plug-in sections 32 of busway are provided with plug-in openings 34 in the main side portions 68 of the side rails 38 at selected locations at which points the bus bars are spaced apart to facilitate tap-off connections. The plug-in openings 34 of the opposite side rails 38 are provided at the same location along the length of the bus bars contained therein, i.e., the openings 34 on the side rail are in registration with the openings on the opposite side rail. The opening 34 is generally rectangular in shape and includes an offset notch 102** at the upper right corner to facilitate ground connections.

A ground clip 104 is fastened to the top portion **44*a*** of the ground upper section of bus by a fastener. Additional holes may be provided above the plug-in opening on the main side portion between the opening and the top channel to facilitate the riveted connection of the side rails to the upper section of the ground bus, if believed desirable.

A joint tie channel 106 is provided to help secure adjoining sections of busway together. The tie channel 106 is substantially U-shaped with a top flange 108 and a bottom flange 110 which overlie the respective top channels 64 and bottom channels 66 of the side rails 38 of adjoining sections of busway. A recessed securing portion 112 is provided at each end of the symmetrical tie channel which forms top and bottom segments of receiving channels at each end of the tie channel that receives respective portions of the channels provided on the side rails.

A generally mushroom-shaped cutout 114 is provided on each securing portion forming securing legs 116 which extend outward on each end of the tie channel 106.

Additional holes 118 are formed in the securing portion which facilitate connection of the tie channel to the side rails of the adjoining sections of busway.

Each plug-in opening 34 is associated with a swingable door 36 and a plug-in vase assembly 120. This concept is similar to that shown in the referenced U.S. Pat. No. 3,566,331; however, a number of substantial differences in assembly and operation should be apparent. The plug-in base 148 of the present invention is formed of an insulating material and is substantially symmetrical in design to be utilized on either side of a busway section. The base 148 and door 150 are retained to the rail member by two drive screws which extend through holes in ears 154 formed on the door as well as holes in ears 156 formed out of the side rail 38 and into a pair of drilled or molded openings 158 in support posts 160 provided on each side of the base 148. The drive screws 152 are fittingly retained in the ears of the side rail 38, while the door 150 and base 148 fit loosely over the drive screw 152 to permit those parts to swing open when tapping high currents which require removal of the base 148 from the plug-in opening 34. A metal cover latch 162 is held in place by a mounting screw 164 in one of the symmetrical latch retaining grooves 166 provided on the front of the base along a side margin of the base. The base 148 is provided with an inwardly embossed portion 168 on its back side directly behind each latch retaining groove 166. A complementarily embossed portion 170 on the side rail 38 on each side of the plug-in opening 34 is received in the embossed portion of the base 168. A mounting screw 164 fits through holes in the base and side rails 172 and 174 repectively at these locations to secure the base 148 to the side rail 38, with one of the grooves 166 receiving a latch 162 which keeps the door 150 shut against the base 148. The latch 162 has a main mounting portion 178 with a pair of sharp upturned side edges 180 which retain the latch in the groove 166 even after the mounting screw 164 has been removed, and further includes a generally U-shaped latching portion with a reverse bent tail 182 that catches an integral catch on the door. The mounting screw 164 can be easily retained between the base 148 and the door 150 when the base is in the swing out position for tap-off since the latch 162 is self retained in the base 148. Although the screw 164 has been fully withdrawn from the side rail 38, it can be retained between the door 150 and the base 148 since the latch 162 continues to secure the door 150 to the base 148. The other mounting screw 164 is also captured between the base 148 and the door 150. Symmetrical base ground openings are provided at opposite corners of the base to facilitate a ground connection. One of these openings 184 is aligned with the ground notch 102 formed in the side rail 38. Of course, only one of the base ground openings 184 will be utilized, although both are necessary to facilitate reversible or interchangeable use of the base 148 on each side rail 38.

Five ribs 188 which define four bus bar supporting compartments are provided on the opposite or back side of the base 148 and extend approximately 1.6 inches from the back side of the rectangular front portion 190. The distal ends 192 of the ribs 188 are substantially more narrow than the rib portions closer to the front portion 190. The ribs 188 are shaped and dimensioned to be positioned in overlapping relationship with the ribs 188 of an opposing base 148 in busway sections having narrow width bus bars wherein sufficient electrical clearance is provided by the overlapping of opposing plug-in bases 148. When a base 148 is switched from one side of the busway to the other it must be rotated 180°, i.e., turned upside down to facilitate overlapping complementary receipt of the paired base. Four plug-in openings 194 are provided which stagger the longitudinal locations of connection to adjacent bus bars. A clearance recess 196 is provided on the front face of the base to provide sufficient oversurface electrical clearance distance between phases.

The connecting joint 122 which is somewhat similar to the type shown in U.S. Pat. No. 3,384,854 is provided to facilitate the connection between sections of busway and can be used to connect a feeder section 30 to another feeder section 30 or to plug-in section 32. The connecting joint 122 includes a top cover plate 124 and a bottom cover plate 126 which each captivate a Belleville washer 128 under a pair of ears 130. A two headed bolt 130 extends through and connects the two cover plates 124 and 126 with a hex nut 134 at the top end which is retained by a nut retaining bracket 136. Each cover plate has an upwardly inclined periphery 138 to lead in for adjoining busway sections. A pair of identical outer insulators 140 or phase barriers and two or three identical inner insulators 142 or phase barriers are provided between the cover plates. Each outer barrier, upon tightening the bolt, provides a ground connection between separate sections of busway as the ground splice plate engages the inner surface of the respective flared ends of ground bus for adjoining sections of busway.

FIG. 11 shows a partial section of plug-in busway which carries two parallel sandwiches 144 of bus bars. Bracing between the bus bars is illustrated by showing the brace assembly 198 on top of a section of busway. The same side rails are used regardless of the width of the busway section while the ground bus is of course formed to an appropriate width to accommodate the size of the bus bars and the number of sandwiches carried by the particular busway section.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

I claim:

1. A plug-in busway section having a pair of side rails, each including a top portion, a bottom portion and a main side portion, and a plurality of plug-in openings located along the length of the section to facilitate tap-off from such locations to bus bars which are spaced apart at those locations, the improvement comprising:

an insulating base providing separate openings to each of said bus bars, said base having a first pair of support posts along one side of said base, each support post having an opening for receiving a fastener.

a door for covering said base, said door having a first pair of ears extending outward from one side of said door, each ear overlapping a respective one of said posts and, having an opening in registration with a respective opening in one of said posts, a second pair of ears extending from said main side portion of said rail in generally parallel relationship with the respective first pair of ears, said second pair of ears each having an opening in registration with a respective opening in said first pair of ears and a respective opening in one of said posts; and a first fastener extending through one of said first ears, one of said second ears and into said opening in one of said posts, and a second fastener extending through the other first ear, the other second ear and into said opening in the other post.

2. A plug-in busway section as claimed in claim 1 wherein the first fastener is fittingly retained within said one second ear and said second fastener is fittingly retained within said other second ear.

3. A plug-in busway section as claimed in claim 2 wherein said door is swingably associated with respect to said first fastener and said second fastener.

4. A plug-in busway section as claimed in claim 3 wherein said insulating base is swingably associated with respect to said first fastener and said second fastener.

5. A plug-in busway section having a pair of side rails and a plurality of plug-in openings located along the length of the section to facilitate tap-off from such locations to bus bars which are spaced apart at those locations, the improvement comprising:

an insulating base swingably mounted to one of said side rails and providing separate openings for tap-off connection to each of said bus bars; said base including a latch retaining groove having a retaining hole therein;

a door swingably associated with said base and movable between a first position permitting access to said openings and a second position substantially overlying said base including said latch retaining groove and preventing access to said openings, said one side rail having a hole in registration with said retaining hole, and a latch positioned within said groove for retaining said door in said second position, said latch including a latch opening in registration with said retaining hole and a mounting screw extending through said latch opening said mounting screw also extending through said retaining hole and extending through said hole in said one side rail securing said base to said one side rail.

6. A plug-in busway section as claimed in claim 5 wherein said latch includes a pair of sharp upturned side edges engaged with said base for retaining said latch within said groove.

7. A plug-in busway section as claimed in claim 6 wherein said mounting screw is retained between said base and said door when said door is in said second position.

* * * * *